July 18, 1961 B. BARÉNYI 2,992,851
SLIDING DOOR FOR MOTOR VEHICLES
Filed Nov. 1, 1957 3 Sheets-Sheet 1
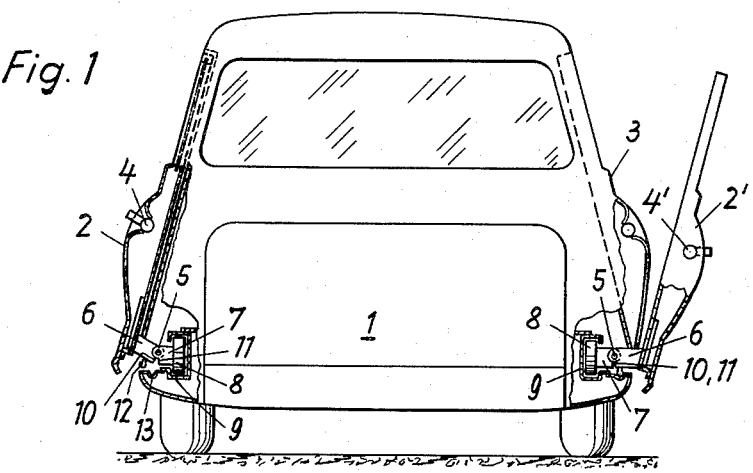
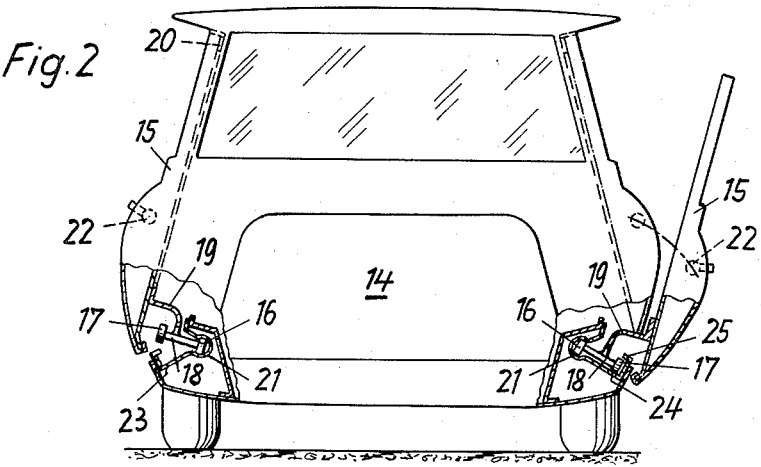
INVENTOR
BÉLA BARÉNYI
BY Dicke and Craig
ATTORNEYS July 18, 1961  B. BARÉNYI  2,992,851
SLIDING DOOR FOR MOTOR VEHICLES
Filed Nov. 1, 1957  3 Sheets-Sheet 2
Fig. 3
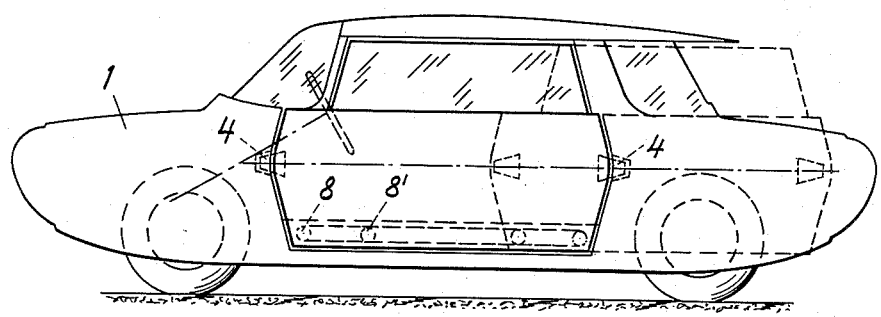
Fig. 4
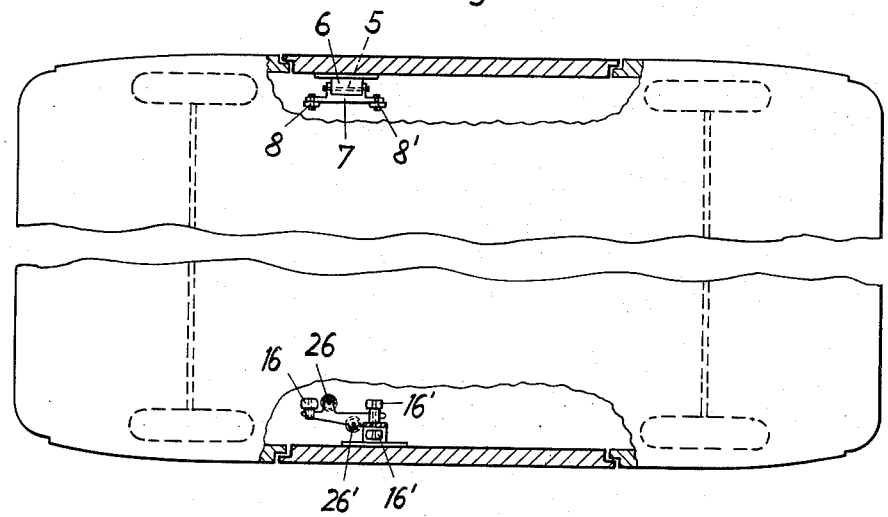
Fig. 5
INVENTOR
BÉLA BARÉNYI
BY Dicke and Craig
ATTORNEYS July 18, 1961  B. BARÉNYI  2,992,851
SLIDING DOOR FOR MOTOR VEHICLES
Filed Nov. 1, 1957  3 Sheets-Sheet 3
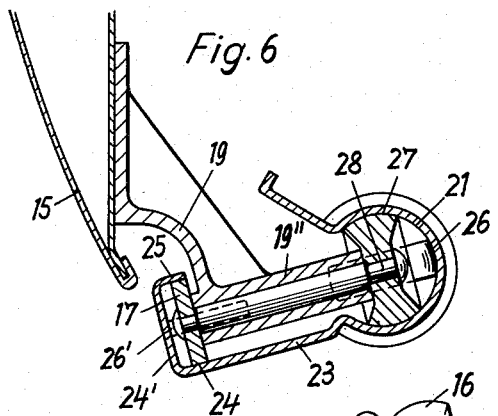
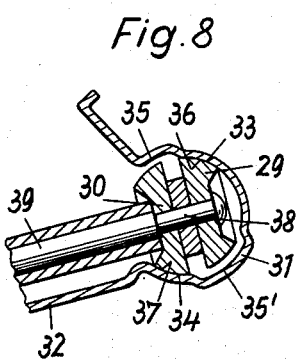
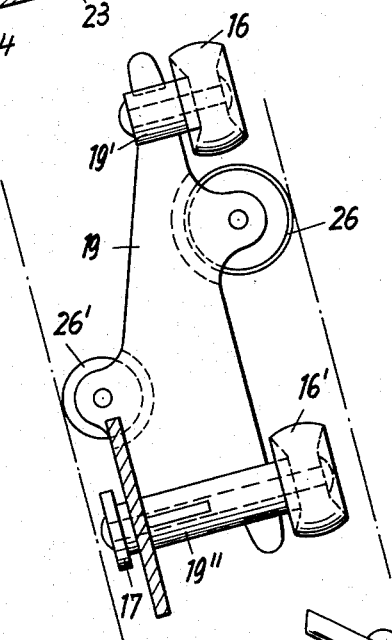
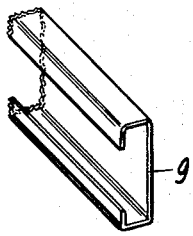
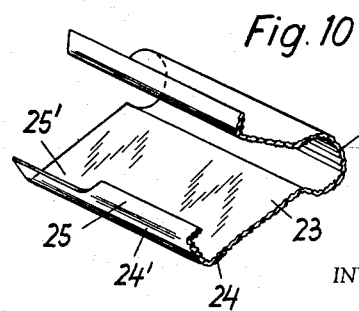
INVENTOR
BÉLA BARÉNYI
BY Dicke and Craig
ATTORNEYS

United States Patent Office 2,992,851
Patented July 18, 1961

2,992,851
SLIDING DOOR FOR MOTOR VEHICLES
Béla Barényi, Stuttgart-Vaihingen, Germany, assignor to Daimler-Benz Aktiengesellschaft, Stuttgart-Untertürkheim, Germany
Filed Nov. 1, 1957, Ser. No. 694,014
Claims priority, application Germany Nov. 10, 1956
18 Claims. (Cl. 296—46)

The present invention relates to a motor vehicle with a closed body and at least one sliding door.

Although most previous types of motor vehicles have been provided with laterally hinged doors, they have the disadvantage of being traffic hazards since when such a door is being opened, it extends considerably away from the vehicle body and may then, especially on the left side, endanger a person stepping out of the vehicle as well as other vehicles which might run into the open door when passing. Furthermore, vehicles with such doors cannot be parked in narrow parking spaces or garages since the adjacent vehicles or walls may not leave sufficient space to permit the door or doors of the respective vehicle to be opened so that a person can easily enter or leave the vehicle.

Although it has already been proposed to overcome this disadvantage by providing the vehicles with sliding doors, these door and door-supporting structures found no practical application because there was not sufficient room within the vehicles for sliding and operating such doors and because these doors could not be mounted so as to be slidable along the outside of the vehicle without harming the appearance of the car body by projecting supporting elements.

It is an object of the present invention to provide a new body and sliding-door structure for motor vehicles which overcomes the disadvantages of the known sliding-door designs.

One important feature of the present invention consists in providing the sliding door with suitable supporting and guiding means, such as rollers, balls, slide members, or the like solely within the area adjacent to the lower edge of the door. The sliding door according to the invention may be supported by means of a few individual rollers in any desired axial position thereof, or by a series or group of rollers which are similarly mounted, but at least by two guide rollers, the rotary axes of which are disposed adjacent to the front or rear edges of the door and extend substantially within a horizontal plane at least when the door is in the closed position.

Another feature of the invention consists in the fact that, after the door lock has been opened, the door is pivotable to an inclined position toward the outside about an axis which is disposed within the area in which the guide rollers are located. The particular manner of mounting and guiding the sliding door as prescribed by the present invention, and the tilted position of the door in which it is disposed outside of the outer panelling of the vehicle body permit the door to be easily slid forwardly or rearwardly and to clear the door opening to such a large extent that the passengers can easily enter and leave the vehicle, that is, to an extent which almost corresponds to the width of the entire door.

According to the invention, the guide rollers themselves are mounted within rails so that, when the door is being opened, it may either be tilted away from the unpivotable rollers or the entire supporting structure consisting of a group of rollers including their bearing structure may be secured to the door and be pivotably mounted within suitable bearing elements which have a cross-sectional shape corresponding to the circular outer shape of the rollers. In the last-mentioned embodiment of the invention the guide rollers together with the entire supporting structure and the door are pivotable about an axis which extends vertically to the axis of the guide rollers, and the supporting structure, in turn, is supported by one or more bracing rollers which are parallel to, but spread from the main guide rollers, and also by other guide rollers which are rotatable about an axis which extends at right angles to the axis of the main guide rollers. The guide rail may be designed so that, after the door has been shifted for a short distance laterally from the fully closed but tilted position toward the open position, the supporting roller or a tilted part of the door will be guided in a manner so as to prevent the door from tilting back toward the vehicle body and from thereby damaging the outer panelling thereof.

Further objects, features, and advantages of the present invention will appear from the following detailed description thereof, particularly when read with reference to the accompanying drawings, in which—

FIG. 1 illustrates a diagrammatic transverse cross section of a car with sliding doors which are pivotably connected to the car body or the frame thereof so as to be tiltable outwardly about a pivotal axis near the lower ends of the doors;

FIG. 2 illustrates a similar cross section of a modification of the door-supporting and guiding structure, in which the sliding doors are outwardly tiltable together with their supporting structure;

FIG. 3 illustrates a diagrammatic side view of a car provided with sliding doors according to FIGS. 1 and 2;

FIG. 4 illustrates a diagrammatic plan view, partly in cross section, of one side of the car, illustrating a sliding door with guide rollers acording to FIG. 1;

FIG. 5 illustrates a plan view similar to FIG. 4 but of a sliding door with guide rollers according to FIG. 2;

FIG. 6 illustrates a vertical cross section of a lower part of a sliding door according to FIG. 2 with a supporting bracket, a supporting or bracing roller, and two sets of guide rollers;

FIG. 7 illustrates a plan view of the structure according to FIG. 6, but with the guide rail being omitted for better illustration;

FIG. 8 illustrates a view similar to FIG. 6 but of a modification of the door-supporting and guiding structure;

FIG. 9 illustrates a perspective view of a part of a U-shaped guide rail for guide rollers according to FIG. 1; while FIG. 10 illustrates a perspective view of a part of a guide rail for guide and supporting rollers according to FIGS. 2 and 5 to 7.

Referring to the drawings, and first particularly to FIGS. 1, 3 and 4, and 9, the left sliding door 2 of a car 1 as illustrated in FIG. 1 is in the closed position, while the right sliding door 2' is in the open position in which it is tilted away from the outer contours 3 of the car body. In order to move a door from the closed to the open position, it is first necessary to open the lock 4 which is preferably provided with two conical bolts which are extendable and retractable in opposite directions to each other from the lateral edges of the door so as to engage in or disengage from corresponding conical sockets or the like within the lateral sides of the door frame, as indicated in FIG. 3. The center of gravity of the door is disposed so that, after lock 4 has been opened, the door will pivot outwardly about a hinge member 5 either of its own accord or by a slight pull on the door handle from the outside or a slight push from the inside. As illustrated more particularly in FIG. 4, one part of hinge 5 forms a bracket 6 which is secured to the door, while the other part of hinge 5 forms a bracket 7 which carries a pair of pin-like shafts on which guide rollers 8 are rotatably mounted at a suitable distance from each other. The guide rollers 8 of each door run within a U-shaped rail 9, as shown in FIG. 9, which embraces the rollers at both sides and is secured to the body or frame of the car. Brackets 6 and 7 are designed so that their lower adjacent edges 10 and 11 will abut against each other when the door is pivoted outwardly, as illustrated at the right side of FIG. 1, and will act as stops to maintain the door in such tilted position relative to the car body. After the door has been tilted outwardly, it may be slid toward the rear on guide rollers 8 which will then roll along guide rail 9 from their original forward position toward their rear position, as indicated in FIG. 3, in whch the door is opened to its fullest extent. In order to prevent the door when it is slid toward the rear from being tilted back against the car body whereby the outer panelling of the car body might be damaged, bracket 6 is preferably provided with a T-shaped portion 12 which, as indicated at the right side of FIG. 1, engages into a slot or supplementary guide rail 13 as soon as the tilted door has been slightly pushed toward the rear from its most forward position.

In the modification of the invention, as illustrated in FIGS. 2, 5, 6, 7, and 10, each sliding door 15 is pivotable together with its entire supporting bracket and the bracing and guide rollers thereon about an axis which is disposed within the car body or its frame. As illustrated particularly in FIGS. 6 and 7, a T-shaped bracket 19 is rigidly secured to door 15 and has integrally mounted thereon a pair of bearing portions 19' and 19'', on which guide rollers 16 and 16' are rotatably mounted. On its other end opposite to and coaxially with guide roller 16', bearing portion 19'' on T-shaped bracket 19 also supports a bracing roller 17 constituting an abutment. Intermediate the rollers 16 and 16' and at the same side of T-shaped bracket 19, the latter carries another guide roller 26 of a diameter equal to that of rollers 16 and 16' and rotatable about an axis which is disposed within a plane 28 which extends centrally through rollers 16 and 16'. At the opposite side, bracket 19 carries a further guide roller 26'. Each of rollers 26 and 26' is rotatable about an axis which is disposed within a plane extending at a right angle to the common plane passing through the axes of guide rollers 16 and 16'.

A guide rail 23 of a shape substantially as illustrated in FIGS. 6 and 10 is secured within the car body or on its frame and extends in a susbtantially horizontal direction at least from one side of the door opening to the other, as indicated in FIGS. 3 and 5. This guide rail 23 has at one side a tubular bearing member 21 of circular cross section and an inner diameter substantially corresponding to the outer diameter of guide rollers 16, 16' and 26, the outer tread surface 27 of which has a curvature corresponding to that of the inner bearing surface of member 21. Integrally connected to the tubular bearing member 21 and opposite thereto, guide rail 23 has a substantially U-shaped portion constituting a second rail, each web 24, 24', and 25 of which serves as a rail for rollers 17 and 26', respectively. However, to permit roller 17 to disengage from the upper flange 25 when the door is almost fully drawn forwardly so that the door can be tilted back against the car body and may then be locked, this flange 25 only extends to a point near the front end of guide rail 24, as illustrated in FIG. 10, so that an open end portion or aperture 25' will remain. The entire roller assembly on bracket 19 is inserted endwise into guide rail 23 which is provided with suitable stops at both ends to limit the sliding movement of the door along rail 24.

When the door 15 is in the closed position, it rests tightly against suitable sealing strips 20 around the door opening of the car body, as indicated in FIG. 2, while the lower end of the door is pulled tightly against the car body by guide rollers 16 and 16' and the bracing rollers 26 and 26' which are disposed at right angles to guide rollers 16 and 16' within guide rail 23. The door lock 22 is preferably of a type as described with reference to FIGS. 1 and 3. When this lock 22 is opened, door 15 will, due to its own weight, pivot outwardly to the position shown at the right side of FIG. 2. Rollers 17 and 26' will then pass through the end aperture 25' of rail 23, roller 26' will engage with the inner surface of web 24' and roller 17 will bear upon the lower web and thereby stop any further tilting movement of the door. When the door is then slid slightly rearwardly on rollers 16, 16', 17, 26, and 26', roller 17 will slide underneath the upper web or flange 25 on bracket 19 which will then prevent the door from being tilted back against the car body. Since bracket 19 is mounted within bearing 21 so as to roll along opposite surfaces thereof and also along opposite surfaces which are disposed at right angles to the first surfaces, the door will be very solidly braced in any position thereof. When the door is locked and when rollers 17 and 26' are disengaged from the U-shaped portion 24, 24', 25, rollers 16, 16', and 26 within bearing member 21 will secure the lower end of the door in a very rigid position. The door will therefore be locked not only centrally at the front and rear ends but also at the lower end, and will therefore be prevented from rattling.

FIG. 8 illustrates a modification of the roller bearing structure in which the supporting bracket carrying the guide rollers is again rigidly secured to the door so that the door, the bracket, and the guide rollers form a single pivotable unit. The bearing structure according to this modification of the invention consists of two pairs of guide rollers 29 and 30 facing toward the inside of the car and of a bracing roller 17, not shown, facing toward the outside of the car corresponding to the single guide rollers 16 and 16' and bracing roller 17, respectively, as shown in FIGS. 2, 6 and 7. Guide rail 32 also has at one side a U-shaped portion, not shown, corresponding to portion 24, 24' 25 as shown in FIG. 6, and at the other side a tubular bearing member which, however, is made of two different inner diameters having a common center 38 and forming two diametrically opposite bearing surfaces 33 and 34 of a smaller diameter and two diametrically opposite surfaces 35 and 35' of a larger diameter. Guide roller 29 engages with its upper side 26 upon bearing surface 33, while guide roller 30 engages with its lower side 37 upon the diametrically opposite bearing surface 34. FIG. 8 illustrates the bracket and guide rollers 29 and 30 in the outwardly tilted position of the door. When the door is tilted back against the car body, the common axis 39 of rollers 29 and 30 will be substantially horizontal and the bearing sides 36 and 37 of the rollers will still be in engagement with bearing surfaces 33 and 34, respectively. Although, because of the circular cross section of bearing surfaces 33 and 34, rollers 29 and 30 can roll along these surfaces in the longitudinal direction of the vehicle and in doing so rotate in opposite directions to each other, and can also pivot about the axis 38, they cannot in any pivotal position shift in the direction of their own axis 39. Apart from the fact that this type of construction will permit the door to slide more easily, it also has the advantage that the additional guide rollers 26 and 26', as shown in FIGS. 6 and 7, will not be required.

Although my invention has been illustrated and described with reference to the preferred embodiments thereof, I wish to have it understood that it is in no way limited to the details of such embodiments, but is capable of numerous modifications within the scope of the appended claims. Thus, for example, while the sliding doors have been described and illustrated as being opened by sliding toward the rear, they may also be designed so as to open by sliding toward the front of the vehicle. The bracket and roller structure instead of being mounted near the front end of each door would then be mounted near the rear end thereof.

Having thus fully disclosed my invention, what I claim is:

1. A sliding door assembly for motor vehicles comprising a sliding door, means to enable said door to be moved laterally from a closed position to an open position including a guide rail mounted on the body of a vehicle and extending in the longitudinal direction thereof substantially at a level of the lower edge of said door, and means secured to the lower part of said door for securing and guiding said door only within said rail during the opening and closing movements of said door, said securing means including pivot means to enable pivotal outward and inward movements of said door relative to said guide rail about a pivot axis disposed near the lower edge of said door and extending substantially horizontally in the longitudinal direction of said vehicle.

2. A sliding door assembly as defined in claim 1, wherein said pivot means comprise at least two bodies of revolution, said securing means including means for rotatably mounting said bodies, said bodies being disposed within said guide rail.

3. A sliding door assembly as defined in claim 1, wherein said guide rail has a length at least equal to the width of the lower part of the door opening in said vehicle.

4. A sliding door assembly as defined in claim 1, wherein said securing and guiding means comprise a hinge member having two parts pivotable to a limited extent relative to each other about a substantially horizontal axis, at least two bodies of revolution disposed within said guide rail and rotatably mounted on one of said hinge parts, said other hinge part being secured to said door at the lower part thereof.

5. A sliding door assembly as defined in claim 1, wherein said means secured to the lower part of said door comprises a substantially T-shaped bracket having one arm secured to the lower part of said door near one lateral edge thereof and a cross arm at one end of said first arm projecting with one side toward the inside of said vehicle body, said pivot means comprising bodies of revolution, said bodies of revolution being rotatably mounted on said inwardly projecting side of said cross-arm, an abutment on the opposite side of said crossarm, a second rail mounted on said vehicle body near the lower end of said door, said second rail having a lower portion adapted substantially to embrace said abutment at the lower side thereof and extending at least along the width of the door opening of said vehicle body and parallel to said first-named rail, said lower portion serving as a stop to limit the extent of the outward pivotal movement of said door, and an upper portion on said second rail parallel to said lower portion and adapted substantially to embrace said abutment at the upper side thereof and at one end being shorter than said lower portion to permit said door to be pivoted when in the closing position only and to prevent said door and the bracket thereon from being pivoted back toward said vehicle body except when said door is substantially in the closing position and when said abutment is released from said upper rail portion by being moved beyond said shorter end thereof.

6. A sliding door assembly as defined in claim 1, further comprising a lock, said door, after said lock has been opened and upon completion of said outward movement, being movable along said rail in the longitudinal direction of the vehicle to an open position, and additional means for supporting said door upon the completion of said outward movement and for guiding said door in a path extending longitudinally of said vehicle to said open position.

7. A sliding door assembly as defined in claim 1, wherein said pivot axis corresponds to the longitudinal axis of said guide rail.

8. A sliding door assembly as defined in claim 2, wherein the rotary axes of said bodies of revolution are disposed within a substantially horizontal plane at least when said door is in the closed position.

9. A sliding door assembly as defined in claim 2, wherein said bodies of revolution are rotatably mounted on said door near the front edge thereof, said door being adapted to be opened by being shifted toward the rear of said vehicle.

10. A sliding door assembly as defined in claim 2, wherein said bodies of revolution are rotatably mounted on said door near the rear edge thereof, said door being adapted to be opened by being shifted toward the front of said vehicle.

11. A sliding door assembly as defined in claim 2, wherein said guide rail has parallel guiding surfaces for supporting and guiding said bodies of revolution both above and below the same.

12. A sliding door assembly as defined in claim 11, wherein said bodies of revolution comprise at least two rollers disposed within said guide rail, said guide rail having a substantially U-shaped cross section and embracing said rollers.

13. A sliding door assembly adapted to be locked as defined in claim 4, further comprising a substantially T-shaped member mounted on the lower side of said hinge part which is secured to said door, and a slotted member extending substantially parallel to said guide rail, said T-shaped member being adapted to enter into and engage with said slotted member when said door, after being unlocked and pivoted outwardly about said hinge member, is shifted to any position toward the open position for preventing said door from being pivoted back toward the vehicle body.

14. A sliding door assembly as defined in claim 5, wherein said bodies of revolution comprise at least two guide rollers rotatably mounted on said bracket and within said first-named guide rail and pivotable within said first-named guide rail about a substantially horizontal axis, said abutment comprising at least one bracing roller rotatably mounted on said bracket coaxially with at least one of said guide rollers and spaced therefrom and adapted to engage with said second rail when said door is pivoted outwardly.

15. A sliding door assembly as defined in claim 5, wherein said second rail is an integral part of said first-named rail and extends parallel thereto, said bodies of revolution comprising at least two guide rollers within said first-named guide rail, said abutment comprising at least one bracing roller rotatably mounted on said bracket coaxially with at least one of said guide rollers and spaced therefrom and adapted to roll within said second rail when said door is pivoted outwardly and is being moved longitudinally of said vehicle, and at least one further guide roller at each side of said bracket, each of said further guide rollers being rotatable about an axis disposed at a right angle to the axes of said first guide rollers, at least one of said further guide rollers at one side of said bracket being disposed within and engaging with said first-named guide rail in any position of said door, and at least one other of said further guide rollers on the other side of said bracket being adapted, together with said bracing roller, to enter into said second guide rail when said door is pivoted outwardly and is then moved slightly toward the open position.

16. A sliding door assembly as defined in claim 5, wherein said guide rail is of substantially tubular shape having a longitudinal slot at the side facing toward said bracket and having two diametrically opposite inner wall portions of arcuate shape together forming two parts of a circle having a common center, and two other diametrically opposite inner wall portions intermediate said first portions but of a larger diameter than said first portions, said bodies of revolution comprising two pairs of guide rollers, the two rollers of each pair being mounted coaxially on said bracket and within said guide rail and each having a tread surface substantially corresponding to the inner curvature and diameter of said first arcuate wall portions, said first and second wall portions being disposed relative to each other so that one guide roller of each pair engages with one of said first wall portions at its upper side, while the other guide roller of each pair engages with the wall portion diametrically opposite to said first wall portion at its lower side.

17. A sliding door assembly as defined in claim 15, wherein said first guide rail has an inner circular cross section, and said first guide rollers and at least one of said further guide rollers disposed within said first-named guide rail each having a tread surface substantially corresponding to the inner curvature and diameter of said first-named guide rail so as to be pivotable about said longitudinal axis of said first-named guide rail.

18. A sliding door assembly as defined in claim 6, wherein said additional means for supporting said door comprises means for preventing pivoting of said door back toward the body of the vehicle from positions of said door along said path.

References Cited in the file of this patent

UNITED STATES PATENTS

| | | |
|---|---|---|
| 553,447 | Bradman | Jan. 21, 1896 |
| 947,947 | Schnoor | Feb. 1, 1910 |
| 1,339,790 | Salladay | May 11, 1920 |
| 2,422,912 | Kling | June 24, 1947 |
| 2,445,131 | Wartian | July 13, 1948 |
| 2,548,950 | Coles | Apr. 17, 1951 |
| 2,589,493 | Henry | Mar. 18, 1952 |
| 2,774,998 | Kiekert | Dec. 25, 1956 |
| 2,783,080 | Ringsby | Feb. 26, 1957 |

FOREIGN PATENTS

| | | |
|---|---|---|
| 389,061 | Great Britain | of 1933 |
| 457,337 | Italy | May 15, 1950 |